UNITED STATES PATENT OFFICE.

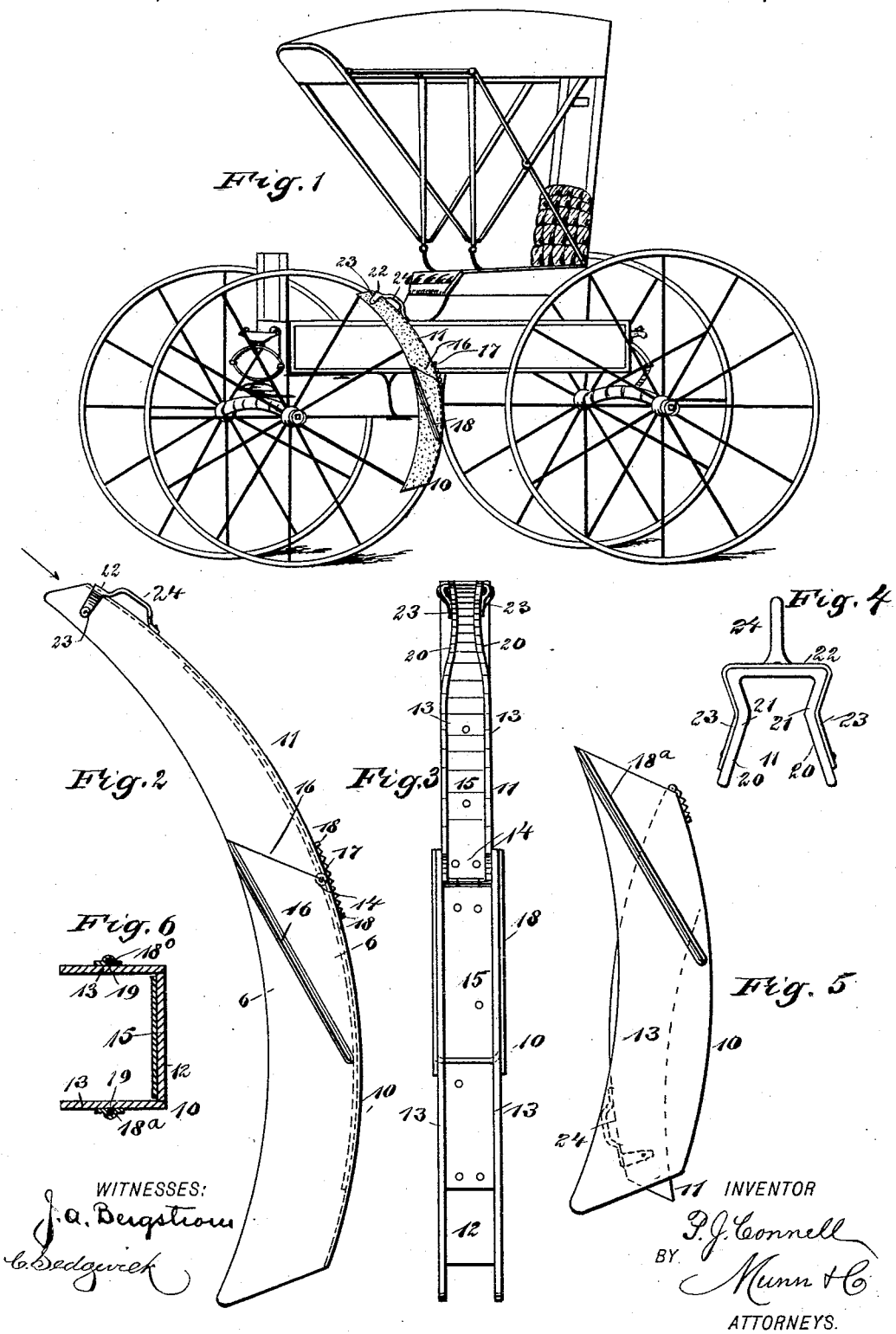

PATRICK J. CONNELL, OF COLLEGE POINT, NEW YORK.

WHEEL-GUARD.

SPECIFICATION forming part of Letters Patent No. 484,300, dated October 11, 1892.

Application filed July 5, 1892. Serial No. 438,977. (No model.)

*To all whom it may concern:*

Be it known that I, PATRICK J. CONNELL, of College Point, in the county of Queens and State of New York, have invented a new and Improved Wheel-Guard, of which the following is a full, clear, and exact description.

My invention relates to improvements in that class of wheel-guards which are adapted to be placed temporarily upon the tire and felly of a carriage-wheel, so as to cover a portion of the wheel and prevent a person, especially a lady, from soiling her clothing when getting into or out of the carriage.

The object of my invention is to produce a light, strong, and simple guard of this character, which may be folded into a small compass, so as to be carried conveniently beneath the carriage-seat, which also will fit very snugly upon the wheel, so as to be held in any desired position, which has a convenient handle by which it may be placed upon and removed from a wheel without soiling the hands, and which has sufficient elasticity to adapt it to wheels of varging sizes.

To this end my invention consists in certain features of construction and combinations of the same, as will be hereinafter described and claimed.

Reference is to be had to the accompanying drawings, forming a part of this specification, in which similar figures of reference indicate corresponding parts in all the views.

Figure 1 is a perspective view of the wheel-guard as applied to the wheel of a carriage. Fig. 2 is a side elevation of the guard when in an open position. Fig. 3 is an inverted plan of the open guard. Fig. 4 is an end view of the same. Fig. 5 is a side elevation of the guard when folded, and Fig. 6 is a cross-section on the line 6 6 of Fig. 2.

The wheel-guard is composed of two somewhat-similar sections 10 and 11, each having a curved back 12 and parallel depending sides 13, adapted to overlap the sides of a wheel tire and felly, and the two sections are hinged together at one end, as shown at 14, the leaves 15 of the hinge which unites them being made to extend well along the back of each section, as shown in Figs. 2 and 3, thus greatly strengthening the guard. The meeting portions of the sides of the sections are cut off diagonally, as shown at 16, thus effecting a saving of material, as the parts will not overlap. The sections are curved, so as to approximate in shape to the segment of an ordinary carriage-wheel, upon which they will fit snugly, and the sides of the sections are sufficiently flexible to allow them to spread more or less. The sections are held in open position when once open by a spring 17, which is secured to keepers 18 on the backs of the sections and on opposite sides of the hinge 14.

The section 10 is slightly larger than the section 11, so that the latter may be folded within the former, as shown in Fig. 5, and to increase the strength of the guard, the larger section 10 is provided on its sides with diagonal ribs 18$^a$, which are firmly secured to the sides 13, and which contain stiffening-rods 19.

The narrower section 11 is reduced in size at its free end, as shown at 20, so as to hug a wheel tire or felly very tightly, and to further facilitate this object the sides of the section 11 bulge inward at the center, as shown at 21 in Fig. 4.

The reduced end 20 of the guard is provided with a clasp 22, which has side members 23, arranged to embrace the reduced end of the guard, and these members are formed of spring material, so as to fit a wheel tire and felly of any ordinary size. A handle 24 is made integral with the clasp 22 and is arranged opposite the back and top of the guard, and by means of this the guard may be easily handled.

When the guard is used, it is simply slipped upon the tire and felly of the carriage-wheel, as shown in Fig. 1, so as to cover that part of the wheel nearest the step of the carriage, and the guard may be placed upon either the front or back wheel, according to which is muddier or nearer the step. After the guard has been used it is pulled from the wheel, folded into the position shown in Fig. 5, and thrown under the seat of the carriage or otherwise disposed of.

It will be noticed by reference to Fig. 5 that the part or section 11 is held entirely within the section 10, and consequently the folded guard occupies but very little space.

Having thus described my invention, I claim as new and desire to secure by Letters Patent—

1. A wheel-guard comprising two sections adapted to lie one within the other, the sections being connected at one end by a hinge and having depending sides adapted to envelop a felly of a carriage-wheel, a spring arranged to normally hold the sections extended, and a spring-clasp arranged to embrace the top and sides of one of the sections, said clasp having a handle secured to it, substantially as described.

2. A wheel-guard comprising two sections having depending sides and hinged together so as to fold one within the other, the inner sections having a reduced free end, with a handle and spring-clasp attached thereto, and the outer section having strengthening-ribs upon its sides, substantially as described.

3. In a wheel-guard, the combination, with the two sections adapted to fit upon a carriage-wheel, of a spring secured to the backs of the two sections and extending across the joint or hinge, substantially as described.

PATRICK J. CONNELL.

Witnesses:
   HENRY WALLTROPP,
   THOMAS SMYTH.